United States Patent Office 3,379,680
Patented Apr. 23, 1968

3,379,680
COMBINATIONS OF NICKEL AMINE THIOBIS-PHENOL COMPLEXES AND DITHIOBISPHE-NOLS FOR POLYOLEFINS
Thomas Robert O'Konski, Bridgewater Township, Somerset County, N.J., assignors to American Cyanamid Company, Stamford, Conn., a corporation of Maine
No Drawing. Filed Oct. 21, 1965, Ser. No. 500,241
6 Claims. (Cl. 260—45.75)

This invention relates to polyolefins stabilized against the deteriorative effects of exposure to weather, U.V. radiation and heat. More particularly, it relates to new compositions of matter comprising a polyolefin, a dithiobis(alkylphenol) and a nickel amine complex of a 2,2'-thiobis(p-alkylphenol).

The problem of stabilizing polyolefins against deterioration is a very complex one, and there has not been yet discovered the ideal stabilizer which can at once solve all problems of instability.

There is disclosed in U.S. Patent No. 3,215,717, issued Nov. 2, 1965, a new type of light stabilizer. These can be characterized as nickel complexes of a 2,2'-thiobis(p-alkylphenol) and a molecule of amine. These "nickel amine complexes of 2,2'-thiobis(p-alkylphenol)" are extremely useful for the intended purpose of light stabilization. Polyolefins having about 0.5% of these complexes remain light stable for extremely long periods.

Quite surprisingly, in addition to their primary function, the nickel amine complexes, to some extent, also act as heat stabilizers, especially when they are used in concentrations of about one percent, or more, of the polyolefin substrate. The heat stabilizing effect falls off sharply with decreasing concentration, so that in the range of about 0.25 to 0.5 percent, nickel amine complexes, while very effective as light stabilizers, are rather ineffectual heat stabilizers. Though possible and useful, it is not commercially practical to add surplus light stabilizer to the polymer for the purpose of gaining heat stability because nickel amine complexes are not low-cost items compared to other heat stabilizers, and, thus, they are not the most effective tool for the job of providing heat stability.

In view of this state of the art of stabilizing polyolefins, it is the object of this invention to provide a composition which can be economically used to stabilize polyolefins against light and heat where requirements for durability of the stabilizing effect are high. It is a further object of this invention to provide stabilized polyolefin compositions having a combination of high stability to light and heat. Still further, it is an object of this invention to provide a method whereby polyolefin materials could be stabilized to attain the aforementioned objects.

These and other objects are accomplished beyond expectation by the present invention in a simple and effective manner. It has been discovered that mixtures of 2,2'- or 4,4'-dithiobis(p-alkylphenols) and a nickel amine complex of 2,2'-thiobis(p-alkylphenol) are capable of providing both heat and light stability to polyolefins for long periods. At the same time, these mixtures advantageously impart little, if any, color when added to the polyolefins. The mixtures which comprise the stabilizers of the present invention provide much greater protection against heat than would be achieved by the use of either component alone. Surprisingly, the improvement in light stability achieved by use of the dithiobisphenol is relatively minor.

Examples of the 2,2'- or 4,4'-dithiobis(alkylphenols) which may be used in preparing the stabilizers of this invention are: 2,2'-dithiobis(p-octylphenol), 2,2'-dithiobis(p-butylphenol), 2,2'-dithiobis(p-cyclohexylphenol), 2,2'-dithiobis(p-nonylphenol), 2,2'-dithiobis(p-ethylphenol), 2,2'-dithiobis(p-amylphenol), 2,2'-dithiobis(p-t-dodecylphenol), 2,2'-dithiobis(p-octadecylphenol), 2,2'-dithiobis(6-t-butyl-p-cresol), 2,2'-dithiobis(4,6-diamylphenol), 2,2'-dithiobis(6-t-butyl-p-ethylphenol), 2,2'-dithiobis(4,6-di-t-octylphenol), 2,2'-dithiobis(6-α-methylcyclohexyl-p-cresol), 4,4'-dithiobis(6-t-butyl-m-cresol), 4,4'-dithiobis(6-t-butyl-o-cresol), and 4,4'-dithiobis(6-α-methylcyclohexyl-o-cresol). Generally stated, the alkyl radical of the dithiobisphenol may contain from 1–18 carbon atoms and may be straight chained or cyclic.

The nickel amine complexes useful in the invention are prepared by heating a nickel complex of 2,2'-thiobis(p-alkylphenol) wherein the alkyl radical may be a cyclic or an open chain moiety, preferably as the 1:1 aquo complex, with an amine in an inert volatile, organic solvent. The product is a nickel amine complex of 2,2'-thiobis(p-alkylphenol) wherein the complex-forming amine is a member selected from the group consisting of ammonia, primary aliphatic amines, primary aromatic amines and cyclic secondary amines, and said alkyl groups have up to eighteen carbons, said complex being characterized by a single nitrogen-to-nickel coordinate bond and a single nickel-to-sulfur coordinate bond, for each nickel atom in the complex molecule.

Examples of the useful 4-alkylphenol sulfides are: bis(p-octylphenol)sulfide, bis(p-butylphenol)sulfide, bis(p-cyclohexylphenol)sulfide, bis(p-nonylphenol)sulfide, bis(p-ethylphenol)sulfide, bis(p-amylphenol)sulfide, bis(p-t-dodecylphenol)sulfide and bis(p-octadecylphenol)sulfide.

Examples of the amines which may be used to form the nickel amine complexes are: ammonia, primary aliphatic amines such as methylamine, ethylamine, propylamine, amylamine, laurylamine, butylamine, octylamine, octadecylamine, ethylene diamine, propylene diamine; primary aromatic amines such as aniline, anisidine, toluidine, 1-naphthylamine, 2-naphthylamine, p-dodecylaniline, p-butylaniline, xylidene and p-octyloxyaniline; and cyclic secondary amines such as morpholine, hexamethyleneimine, piperazine and piperidine.

The stabilizer of the present invention may be prepared most simply by mixing the two components in the desired proportions with or without a mutual solvent until a homogeneous blend is obtained. The blend may then be incorporated in the polyolefin to be stabilized by milling. The milled product may be formed by compression-molding into films or sheets, or any other desired shape.

In using the combination of this invention in polyolefins, from 0.1 to 5% of the nickel amine complex and from 0.02 to 0.5% of the dithiobisphenol are used, based on the polyolefin. The concentration of the dithiobisphenol should be less than the amount of the nickel complex and, in general, is used in a concentration of one part for each 5–15 parts of nickel amine complex. A preferred range of usage is from 0.5 to 2.0% of the nickel amine complex and from 0.05 to 0.2 of the dithiobisphenol; a particularly preferred practical concentration of each is 1% of the nickel amine complex and about 0.1% of the dithiobisphenol. In general, the stabilized polymer will have about 0.1 to about 5.0% of the stabilizer concentration.

The preferred nickel amine complex is 2,2'-thiobis-(p-t-octylphenol)butylamine nickel complex; the preferred dithiobisphenol species is 2,2'-dithiobis(p-t-octylphenol).

It is an advantage of the present invention that the stabilizer thereof can be used to stabilize any polyolefin including polyethylene, polypropylene, polybutylenes, and copolymers of these, such as ethylenepropylene copolymers.

The following examples in which parts and percentages are by weight are presented to show several preferred embodiments of the present invention.

Example 1

Effectiveness of the stabilizer of this invention in polypropylene was determined by exposing polypropylene compositions to ultraviolet light and heat, and determining the time before development of brittleness. The procedure is described in more detail as follows:

Fifty grams of polypropylene powder were placed in a screw-top jar along with the additive to be tested. The blend was tumbled for two hours. This mixture was placed on a 6" x 13" mill whose rolls were heated to 360° F. and 320° F., respectively. This blend was passed through the nip of the rolls, stripped from the rolls and fed end-wise into the nip to insure maximum mixing. This operation of stripping and passing through the nip was repeated ten times. From the sheet resulting from this blend, a 10 to 15 ml. sheet was compression-molded. From this molded sheet, specimens were cut out for the test.

In the following table are shown the hours of exposure in the Fade-Ometer (FOM) and the Fluorescent Sun-lamp-Black Light (FS–BL) to the brittle point; and also hours of exposure to heat in an oven at 125–140° C. before embrittlement.

TABLE I

| No. | Additive | Polypropylene Brittle Point (hours) | | | |
|---|---|---|---|---|---|
| | | Oven 125° C. | 140° C. | FS–BL | FOM |
| 1 | Control | | <4 | | |
| 2 | 2,2'-thiobis(p-octylphenyl)-butylamine nickel complex (1.0%) | 1,150 | 288 | 1,500 | 3,500 |
| 3 | 2,2'-thiobis(p-octylphenyl)-butylamine nickel complex (1.0%)+2,2'-dithiobis(p-octylphenol) (0.1%) | 2,310 | 700 | 1,500 | 3,500 |
| 4 | 0.1% 2,2'-dithio-bis(p-octyl-octylphenol) | | 48 | | |

It can be seen that where neither the nickel amine complex nor the dithiobisphenol were used (the control), the polypropylene had hardly any stability at 140° C. Use of the nickel amine complex increased heat stability to the 288 hour level at 140° C. Use of a combination of the nickel complex and a dithiobisphenol (this invention), more than doubled the heat stability of the polypropylene. Surprisingly, the dithiobisphenol by itself, added only slightly to the heat stability of the polypropylene.

Example 2

Following the procedure of Example 1, using the same 1.0% of the nickel amine complex, combinations with other dithiobisphenols were tested in polypropylene with the followings results.

TABLE II.—STABILIZATION WITH NICKEL AMINE COMPLEX AND DITHIOBISPHENOLS

| No. | Dithiobisphenol Additive (0.1%) | Hours to Brittle Point | |
|---|---|---|---|
| | | Oven 140° C. | FOM |
| 1 | 2,2'-dithiobis(4-octylphenol) | 1,250 | >2,000 |
| 2 | 2,2'-dithiobis(6-butyl-p-cresol) | 756 | >2,000 |
| 3 | 2,2'-dithiobis(4,6-diamylphenol) | 1,147 | >2,000 |
| 4 | 4,4'-dithiobis(6-butyl-o-cresol) | 900 | >2,000 |

Example 3

The melt-index which gives a measure of the degradation of the polymer upon exposure to heat is determined by observing the amount of polymer extruded through an orifice under a predetermined set of conditions. An increase in the value of the melt-index under exposure to heat gives a measure of polymer degradation.

The procedure used is described as follows:

An eight-gram sample of polypropylene containing the additive, prepared as described in Example 2, is charged to a melt-index apparatus described in ASTM D1238–62T heated at 275° C. A load of 2160 grams is applied and the extrudate which forms between the second and third minutes of flow is collected and weighed. The weight of the extrudate times 10 is defined as the initial melt index. The load is then removed and the material in the apparatus is allowed to age at 275° C. for twenty minutes. The same load is again applied and the extrudate measured and the melt-index determined as described above.

The results are shown in the following table:

TABLE III

| No. | Additive | Melt Index at 275° C. | |
|---|---|---|---|
| | | Initial | After 20 Minutes Exposure |
| 1 | None (control) | 34 | (¹) |
| 2 | 2,2'-thiobis(p-t-octylphenol)-butylamine nickel complex (1.0%) | 8 | 14 |
| 3 | 2-2'-dithiobis(p-t-octylphenol) (0.1%) | 4 | 12 |
| 4 | Nickel complex of Run 2 (1%) plus 2,2'-dithiobis(p-t-octylphenol) (0.1%) | 5 | 8 |

¹ Unmeasurable.

Example 4

In order to show the importance of using a dithiobisphenol instead of a monothio compound, the procedure of Example 1 was repeated identically with polymer samples having 0.25% of the nickel complex alone, and combinations of the latter with 0.1% of 2,2'-thiobis(4-octylphenol) and 0.1% of 2,2'-dithiobis(4-ocytlphenol), respectively. Results of the tests are as follows:

TABLE IV.—USE OF MONOTHIOBISPHENOL AND NICKEL AMINE COMPLEX

| No. | Additive | Conc. (percent) | Hours to Brittle Point | |
|---|---|---|---|---|
| | | | Oven 140° C. | FOM |
| 1 | None | | | |
| 2 | Nickel complex | 0.25 | 51 | 2,000 |
| 3 | Nickel complex | 0.25 | 46 | 740 |
| | Monothio compound | 0.1 | | |
| 4 | Nickel complex | 0.25 | 140 | 2,000 |
| | Dithio compound | >0.1 | | |

It will be noted that the monothio compound actually impaired the heat and light stability of the polymer in the presence of the nickel amine complex.

I claim:
1. A composition of matter useful as a stabilizer for polymers which comprises a mixture of (a) a nickel amine complex of 2,2'-thiobis(p-alkylphenol) wherein the complex-forming amine is a member selected from the group consisting of ammonia, primary aliphatic amines, primary aromatic amines and cyclic secondary amines, and said alkyl groups, have up to eighteen carbons, said complex being characterized by a single nitrogen-to-nickel coordinate bond and a single nickel-to-sulfur coordinate bond, for each nickel atom in the complex molecule and (b) a 2,2'- or 4,4'-dithiobis(alkylphenol) wherein the alkyl group has up to eighteen carbon atoms, the proportion of said components being from 5 to 15 weight parts of (a) per part of (b).

2. The composition of claim 1 wherein component (a) is the nickel butylamine complex of 2,2'-thiobis(p-octylphenol).

3. The composition of claim 1 wherein component (b) is 2,2'-dithiobis(p-octylphenol).

4. A stabilized polyolefin composition comprising a polymer of a member selected from the group consisting of ethylene, propylene and butylene and 0.1 to 5 weight percent of the stabilizer of claim 1.

5. The polyolefin composition of claim 4 wherein the stabilizer is a mixture of the nickel butylamine complex of 2,2'-thiobis(p-octylphenol), and 2,2'-dithiobis(p-octylphenol).

6. The composition of claim 4 wherein the polymer is polypropylene.

References Cited

UNITED STATES PATENTS 3,057,926  10/1962  Coffield _____ 260—609
3,215,717  11/1965  Foster _____ 260—439

DONALD E. CZAJA, *Primary Examiner.*

V. P. HOKE, *Assistant Examiner.*

UNITED STATES PATENT OFFICE
CERTIFICATE OF CORRECTION

Patent No. 3,379,680                      April 23, 1968

Thomas Robert O'Konski

It is certified that error appears in the above identified patent and that said Letters Patent are hereby corrected as shown below:

Columns 3 and 4, TABLE I, second column, lines 9 and 10 thereof, "(p-octyl-octylphenol)" should read -- (p-octylpheno --.

Signed and sealed this 14th day of October 1969.

(SEAL)
Attest:

Edward M. Fletcher, Jr.                   WILLIAM E. SCHUYLER, JR.
Attesting Officer                         Commissioner of Patents